United States Patent
Yokoi et al.

(10) Patent No.: US 10,328,385 B2
(45) Date of Patent: Jun. 25, 2019

(54) CARBON DIOXIDE-CONTAINING GAS RECOVERY APPARATUS

(71) Applicants: Yasuna Yokoi, Aichi (JP); Anlet Co., Ltd., Aichi (JP)

(72) Inventors: Yasuna Yokoi, Aichi (JP); Toshiaki Kato, Aichi (JP); Hideyuki Okano, Aichi (JP); Yoshinobu Ito, Aichi (JP)

(73) Assignee: Anlet Co., Ltd., Ama-gun, Aichi (JP)

(*) Notice: Subject to any disclaimer, the term of this patent is extended or adjusted under 35 U.S.C. 154(b) by 9 days.

(21) Appl. No.: 15/521,147

(22) PCT Filed: Jun. 21, 2016

(86) PCT No.: PCT/JP2016/068373
§ 371 (c)(1),
(2) Date: Apr. 21, 2017

(87) PCT Pub. No.: WO2017/221322
PCT Pub. Date: Dec. 28, 2017

(65) Prior Publication Data
US 2018/0185783 A1 Jul. 5, 2018

(51) Int. Cl.
*B01F 3/04* (2006.01)
*F03C 2/00* (2006.01)
(Continued)

(52) U.S. Cl.
CPC .............. *B01D 53/18* (2013.01); *B01D 53/62* (2013.01); *B01F 1/00* (2013.01); *B01F 3/04* (2013.01);
(Continued)

(58) Field of Classification Search
CPC ...... B01F 3/04; F03C 2/00; F03C 4/00; F03C 18/00
(Continued)

(56) References Cited

U.S. PATENT DOCUMENTS 8,459,974 B2 * 6/2013 Yokoi .................. F04C 18/084
277/353

FOREIGN PATENT DOCUMENTS

JP 4231735 B2 3/2009
JP 4385424 B2 12/2009
(Continued)

OTHER PUBLICATIONS

Office action of corresponding JP application No. 2017-519581 dated Jun. 14, 2018 and English translation thereof.

*Primary Examiner* — Robert A Hopkins
(74) *Attorney, Agent, or Firm* — Muncy, Geissler, Olds & Lowe, P.C.

(57) ABSTRACT

A pump housing of the carbon dioxide-containing gas recovery apparatus is formed with a first chamber and a second chamber partitioned by a partition wall. The first and second chambers and communicate with each other through a third chamber. The first chamber communicates with a water supply opening and a carbon dioxide-containing gas inlet. When blown against water filling the first chamber, a carbon dioxide-containing gas is dissolved in the water, and the carbon dioxide-containing gas remaining undissolved exists as bubbles in the water. When a pair of six-blade rotors oppositely disposed on two axes and in the third chamber compress the bubbles to be refined into different bubbles, the carbon dioxide-containing gas can further be dissolved in the water by a compression action. An aqueous solution of carbon dioxide-containing gas is discharged from a water outlet communicating with the second chamber.

2 Claims, 5 Drawing Sheets

(51) Int. Cl.
*F03C 4/00* (2006.01)
*B01D 53/18* (2006.01)
*B01F 5/12* (2006.01)
*B01D 53/62* (2006.01)
*B01F 1/00* (2006.01)
*B01D 53/14* (2006.01)

(52) U.S. Cl.
CPC .................. *B01F 5/12* (2013.01); *F03C 2/00* (2013.01); *F03C 4/00* (2013.01); *B01D 53/1475* (2013.01); *B01D 2252/103* (2013.01); *B01D 2258/0283* (2013.01)

(58) Field of Classification Search
USPC ......................................... 261/76; 418/206.5
See application file for complete search history.

(56) References Cited

FOREIGN PATENT DOCUMENTS

| | | |
|---|---|---|
| JP | 3170128 U | 8/2011 |
| JP | 2011240322 A | 12/2011 |
| JP | 2013022528 A | 2/2013 |

\* cited by examiner

FIG.5

| CASE | MEASURED VALUE OF INJECTED CO2 AMOUNT [L/min] | MEASURED VALUE OF INJECTED AIR [L/min] | CO2 CONCENTRATION [%] | MEASURED VALUE OF INJECTED WATER [L/min] | MEASURED VALUE OF CO2 IN WATER [mg/L] |
|---|---|---|---|---|---|
| A | 10 | 90 | 10 | 120 | 81.2 |
| B | 20 | 80 | 20 | 130 | 147.2 |
| C | 30 | 70 | 30 | 190 | 149.7 |

| CASE | CO2 AMOUNT IN INJECTED WATER [g/h] | CO2 AMOUNT IN INJECTED AIR [g/h] | MEASURED VALUE OF DISSOLVED CO2 [g/h] | CO2 AMOUNT DISSOLVED BY THIS APPARATUS [g/h] | CO2 AMOUNT EMITTED INTO ATMOSPHERE [g/h] | CO2 RECOVERY RATE OF THIS APPARATUS [%] |
|---|---|---|---|---|---|---|
| A | 131.0 | 1086.0 | 584.6 | 453.6 | 763.4 | 37.3 |
| B | 142.0 | 2172.0 | 1148.2 | 1006.2 | 1307.8 | 43.5 |
| C | 207.5 | 3258.0 | 1706.6 | 1499.1 | 1966.4 | 43.3 |

| CASE | OUTPUT OF MOTOR 12 [kW] | CO2 AMOUNT EMITTED BY MOTOR 12 [g/h]* | TOTAL RECOVERED CO2 AMOUNT [g/h] |
|---|---|---|---|
| A | 1.2 | 596.4 | -142.8 |
| B | 1.2 | 596.4 | 409.8 |
| C | 1.6 | 795.2 | 703.9 |

* Where CO2 emission factor (Chubu Electric Power Co., Inc.) of 497 [gCO2/kW] is applied.

CARBON DIOXIDE-CONTAINING GAS RECOVERY APPARATUS

TECHNICAL FIELD

The present invention relates to a carbon dioxide-containing gas recovery apparatus.

BACKGROUND ART

Carbon dioxide-containing gases have conventionally been known as ones each having a greenhouse effect causing global warming. A large-scale generation source generating a massive amount of carbon dioxide-containing gas includes thermo-electric power plants, steel plants, and waste incineration plants. Various types of carbon dioxide-containing gas recovery apparatuses have been disclosed which have a purpose of recovering carbon dioxide-containing gases generated in the large-scale generation sources.

Japanese Patent No. 4231735 discloses a carbon dioxide separation/recovery apparatus which absorbs carbon dioxide-containing gases from a blast furnace gas by a chemical absorption solution and applies exhaust heat from a steel plant to the chemical absorption solution, thereby separating the carbon dioxide-containing gases.

Furthermore, Japanese Patent No. 4385424 discloses a carbon dioxide concentration apparatus which includes a concentrating cell further including an electrolyte plate placed between a cathode and an anode from opposite sides. The concentrating cell is made of a porous material impregnated with electrolyte. An electrical potential is applied between the cathode and the anode. A carbonate ion is generated from a raw material gas supplied to the cathode, by an electrochemical reaction. The carbonate ion is electrochemically reacted in the anode so that carbon dioxide is selectively separated therefrom. A mixed gas comprising the carbon dioxide and water vapor or nitrogen each serving as a diluent gas is taken out of the concentrating cell. The carbon dioxide-containing gas is recovered by separating the water vapor or the nitrogen from the mixed gas.

PRIOR ART DOCUMENT

Patent Documents

Patent Document 1: Japanese Patent No. 4231735
Patent Document 2: Japanese Patent No. 4385424

SUMMARY OF THE INVENTION

Problem to Be Overcome by the Invention

However, the above-described apparatuses require equipment including a circulation path for the chemical absorption solution, a heating device for introducing the waste heat or a concentrating cell, and a potential applying device. Each piece of the equipment requires an extensive equipment cost.

The inventor previously invented a low-cost carbon dioxide-containing gas recovery apparatus which agitates a carbon dioxide-containing gas and water to recover the carbon dioxide-containing gas, taking note that the carbon dioxide-containing gas dissolves in water.

However, the prior invented carbon dioxide containing gas recovery apparatus simply agitates water with the carbon dioxide-containing gas dissolved therein in a tank to further dissolve the carbon dioxide containing gas in the water. A carbon dioxide-containing gas recovery efficiency is lower than expected.

Accordingly, an object of the present invention is to provide a carbon dioxide-containing gas recovery apparatus which is lower in costs and can improve the carbon dioxide-containing gas recovery efficiency.

Means for Overcoming the Problem

A carbon dioxide-containing gas recovery apparatus described in claim 1 dissolves a carbon dioxide-containing gas in water thereby to recover the carbon dioxide-containing gas. The apparatus includes a pump housing having a first chamber provided with a water supply opening and a carbon dioxide-containing gas inlet, a second chamber provided with a water outlet and a third chamber communicating between the first and second chambers, and a rotary mixing section including a pair of multiblade rotors and an electric motor driving the rotors and installed in the third chamber. In the apparatus, water is supplied through the water supply opening into the first chamber and a carbon dioxide-containing gas is supplied through the inlet into the first chamber to be dissolved in the water. The water in which the carbon dioxide-containing gas is dissolved is pressure-fed from the first chamber to the third chamber by the rotary mixing section to be discharged through the water outlet.

In the carbon dioxide-containing gas recovery apparatus described in claim 2, the multiblade rotors are six-blade rotors and the rotary mixing section is a biaxial six-blade pump in which the six-blade rotors are disposed in a biaxial parallel manner in the invention described in claim 1.

In the carbon dioxide-containing gas recovery apparatus according to the present invention, when bubbles generated by the carbon dioxide-containing gas dissolved in the water in the first chamber are pressure-fed into the second chamber by the rotary mixing section, a space encompassed by protrusions of one of the six-blade rotors and one of the protrusions of the other six-blade rotor is reduced in cubic capacity. The bubbles are compressed with the reduction in the cubic capacity of the space thereby to be refined. Consequently, the carbon dioxide-containing gas can efficiently be dissolved in water with the result that the carbon dioxide-containing gas recovery efficiency can be improved. The carbon dioxide-containing gas recovery efficiency can be improved particularly in the case of a biaxial six-blade pumps in which the six-blade rotors are disposed in a biaxial parallel manner.

In the carbon dioxide-containing gas recovery apparatus according to the present invention, furthermore, the apparatus has a simple structure such that the pump housing is divided into the three chambers and the rotary mixing section is housed in the third chamber. Consequently, the apparatus can easily be downsized and can reduce equipment costs to a larger extent as compared with conventional carbon dioxide-containing gas recovery apparatuses.

BRIEF DESCRIPTION OF THE DRAWINGS

FIG. 5 is a list of results of carbon dioxide-containing gas recovery efficiency experiment regarding the carbon dioxide-containing gas recovery apparatus of the embodiment.

BEST MODE FOR CARRYING OUT THE INVENTION

A carbon dioxide-containing gas recovery apparatus according to the present invention is installed near a carbon dioxide-containing gas outlet provided in a large-scale generation source of carbon dioxide-containing gas, such as a thermo-electric power plant, a steel plant, or a waste incineration plant. The carbon dioxide-containing gas recovery apparatus recovers a water solution of carbon dioxide-containing gas, thereby recovering the carbon dioxide-containing gas.

FIGS. 1 to 5 are attached to explain an embodiment of the present invention. The embodiment will be described below with reference to FIGS. 1 to 5.

Figure 1:
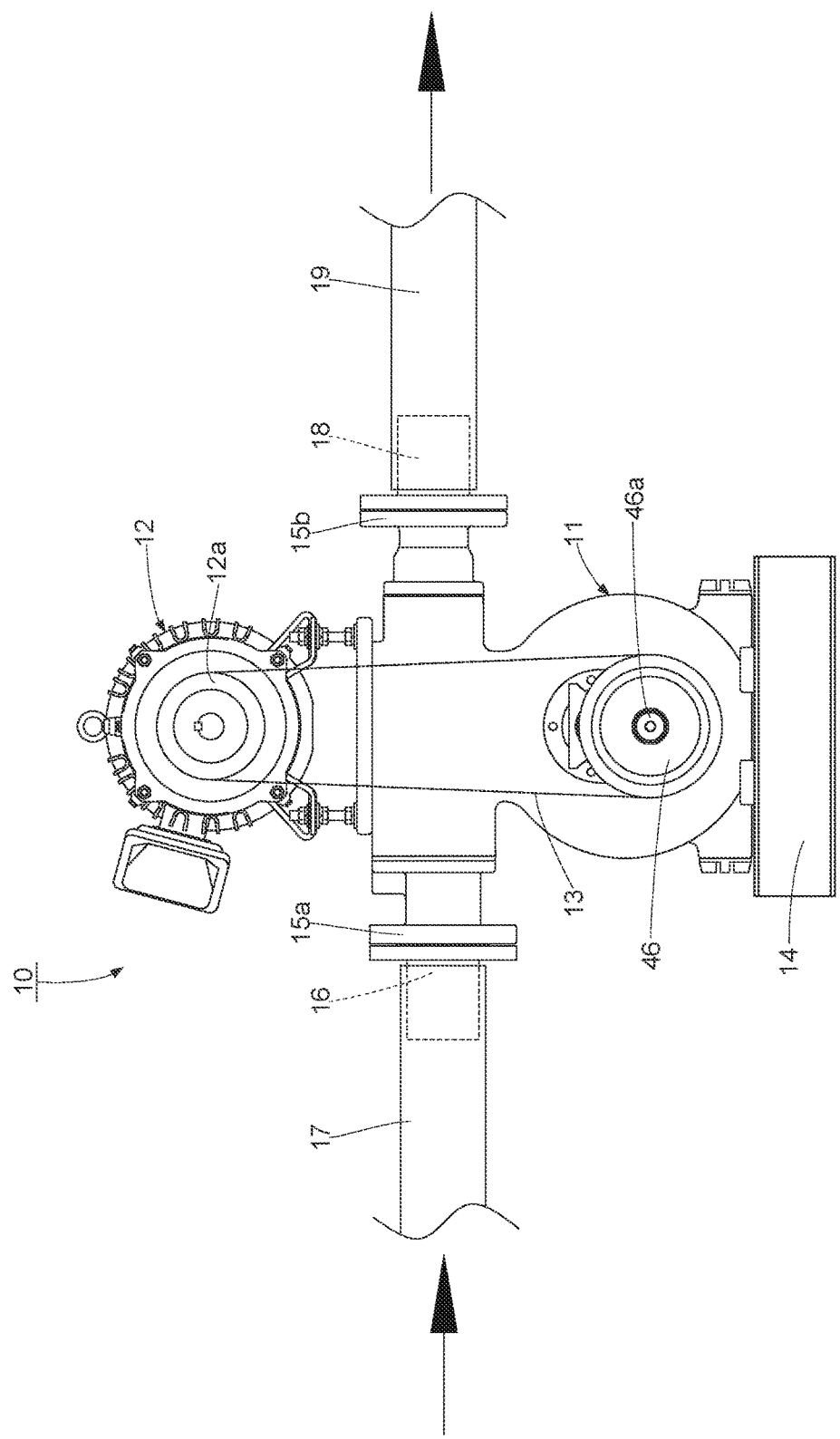
FIG. 1 is a schematic front view of the carbon dioxide-containing gas recovery apparatus of an embodiment, illustrating the structure thereof.
Figure 2:
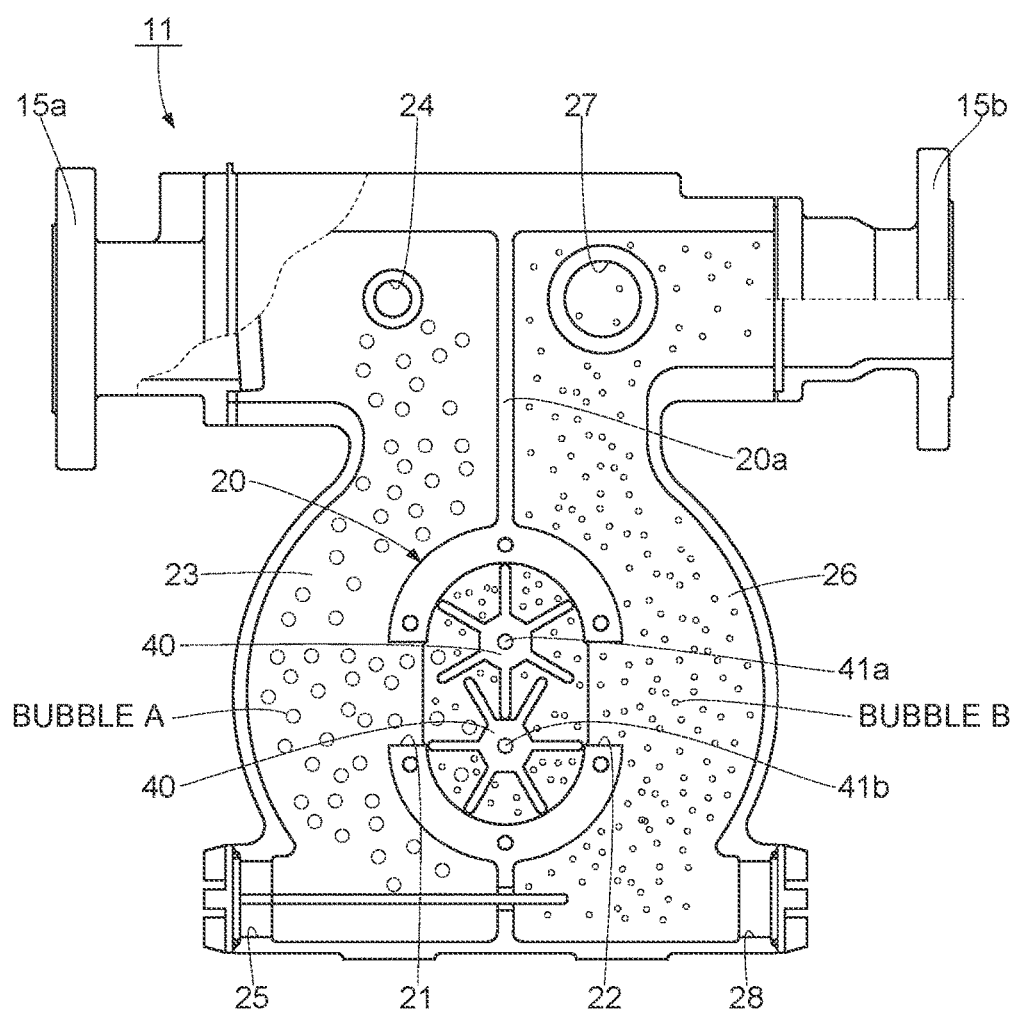
FIG. 2 is a front view of a six-blade biaxial pump of the carbon dioxide-containing gas recovery apparatus, illustrating an inner structure of the six-blade biaxial pump.
Figure 3:
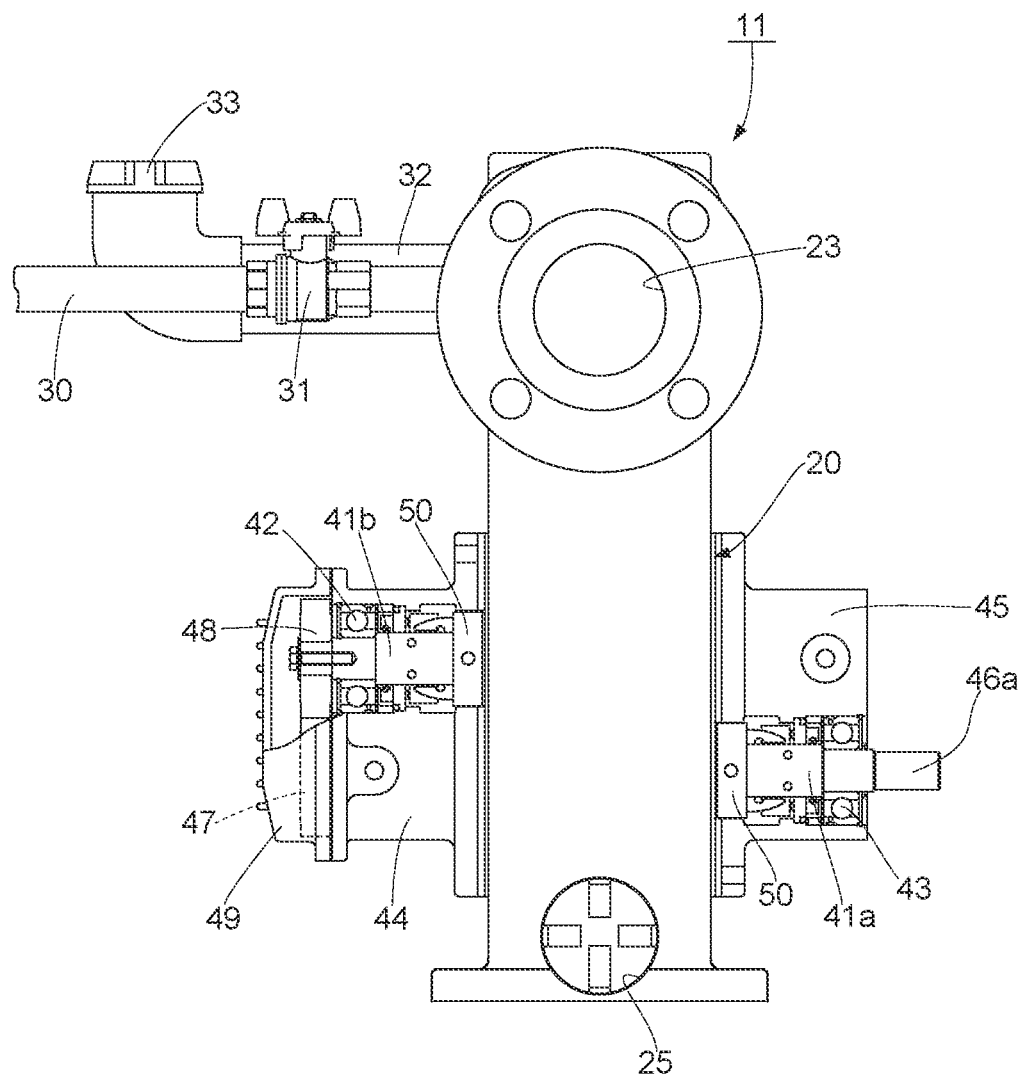
FIG. 3 is a side elevation of the six-blade biaxial pump of the carbon dioxide-containing gas recovery apparatus, illustrating an inner structure of the six-blade biaxial pump.

FIG. 1 is the schematic front view of the carbon dioxide-containing gas recovery apparatus of the embodiment. FIG. 2 is the front view of the six-blade biaxial pump of the carbon dioxide-containing gas recovery apparatus, illustrating the inner structure of the six-blade biaxial pump. An electric motor placed on a pump housing in FIG. 1 is eliminated in FIG. 2. FIG. 3 is the side elevation of the six-blade biaxial pump of the carbon dioxide-containing gas recovery apparatus, illustrating an inner structure of the six-blade biaxial pump illustrated in FIG. 2.

Figure 4:
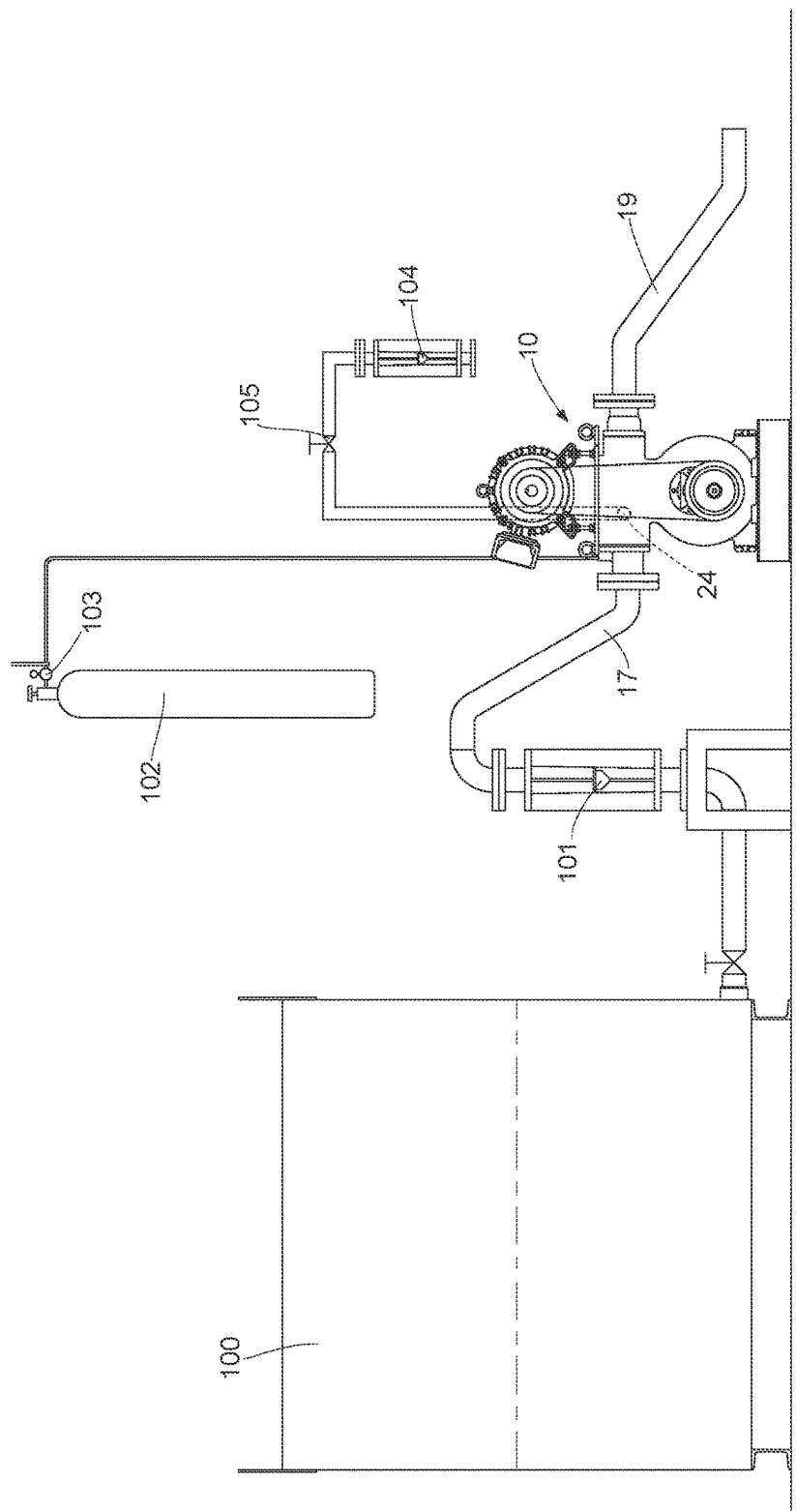
FIG. 4 is a schematic explanatory diagram illustrating the structure of an experiment device testing the carbon dioxide-containing gas recovery efficiency of the carbon dioxide-containing gas recovery apparatus of the embodiment.

Furthermore, an experiment was conducted to test a carbon dioxide-containing gas recovery efficiency in the embodiment. In the experiment, a carbon dioxide gas cylinder was used instead of a large-scale carbon dioxide-containing gas generation source, and water was supplied from a water tank in order that a prescribed amount of water might easily be grasped. FIG. 4 is the schematic explanatory diagram illustrating an experiment device and experimental circumstances for the experiment. FIG. 5 is a list of results of the experiment.

EMBODIMENT

The embodiment of the carbon dioxide-containing gas recovery apparatus according to the invention will now be described with reference to the accompanying drawings. In the embodiment, the carbon dioxide-containing gas will be referred to as an emission gas which is emitted from a large-scale generation source and contains at least a carbon dioxide gas. A water solution made by dissolving the carbon dioxide-containing gas in water will be referred to as a water solution of the carbon dioxide-containing gas.

Referring to FIG. 1, a carbon dioxide-containing gas recovery apparatus 10 includes a pump housing 11, an electric motor 12, a transmission belt 13 connecting the motor 12 and the pump housing 11 to each other, and a base 14 on which the pump housing 11 and the motor 12 are mounted.

The pump housing 11 has an interior divided into a first chamber 23 and a second chamber 26 so that the first and second chambers 23 and 26 are opposed to each other with a partition wall 20a being placed therebetween, as illustrated in FIG. 2. A third chamber 20 is formed in a communication part between the first and second chambers 23 and 26.

Thus, the pump housing 11 is formed so that water in the first chamber 23 and water in the second chamber 26 are prevented from being mixed with each other and so that water needs to flow through the third chamber 20 in order to be fed from the first chamber 23 into the second chamber 26.

The first chamber 23 is provided with a water supply opening 15a at a side of the first chamber 23 and a gas inlet 24 through which a carbon dioxide-containing gas is introduced.

The water supply opening 15a has a flange, and a flanged fitting 16 has a flange which is oppositely disposed to be connectable to the flange of the water supply opening 15a, as illustrated in FIG. 1. A water supply pipe 17 supplying water to the pump housing 11 is connected to the flanged fitting 16.

A gas introducing pipe 30 is connected to the gas inlet 24 as illustrated in FIG. 3. The gas introducing pipe 30 has an on-off valve 31. The on-off valve 31 is opened so that a carbon dioxide-containing gas is introduced into the first chamber 23.

When water is supplied through the water supply opening 15a into the first chamber 23 and a carbon dioxide-containing gas is blown against the water, the carbon dioxide-containing gas can be dissolved in the water in the first chamber 23, and an undissolved carbon dioxide-containing gas exists as bubbles A in water as illustrated in FIG. 2.

The first chamber 23 has a lower end formed with a drainage hole 25 through which the water is dischargeable. As a result, water stored in the first chamber 23 can easily be discharged during maintenance or the like.

The second chamber 26 is formed with a water outlet 15b and a priming water supply opening 27.

The water outlet 15b has a flange, and a flanged fitting 18 has a flange which is oppositely disposed to be connectable to the flange of the water outlet 15b, as illustrated in FIG. 1. A water discharge pipe 19 through which the water is discharged out of the pump housing 11 is connected to the flanged fitting 18.

A priming water supply pipe 32 has two ends one of which is connected to the priming water supply opening 27 as illustrated in FIG. 3. A priming water supply faucet 33 is connected to the other end of the priming water supply pipe 32. In starting the carbon dioxide-containing gas recovery apparatus 10, priming water is supplied through the priming water supply pipe 32 into the pump housing 11, whereby the priming water is stored in the pump housing 11 so as to fill at least the third chamber 20. As a result, six-blade rotors 40, which will be described later, can be prevented from idle running.

The second chamber 26 has a lower end formed with a drainage hole 28 through which the water in the first chamber 23 can be discharged. As a result, the water stored in the first chamber 23 can easily be discharged during maintenance or the like.

A pair of six-blade rotors 40 are disposed in the third chamber 20 in a biaxial parallel manner as illustrated in FIG. 2. The third chamber 20 has an inlet 21 communicating with the first chamber 23 and an outlet 22 communicating with the second chamber 26.

The paired six-blade rotors 40 respectively have rotor shafts 41a and 41b. The paired six-blade rotors 40 are each formed with six protrusions radially extending about the respective rotor shafts 41a and 41b. When the six-blade rotors 40 are rotated in respective directions opposed to each other, a space is encompassed, at the inlet 21 side, by three sides formed by two adjacent protrusions of one of the six-blade rotors 40 and one of the protrusions of the other six-blade rotor 40. A volume of the space is reduced with rotation of the six-blade rotors 40, so that water introduced into the space is pressurized and a gas is compressed. Upon further rotation of the six-blade rotors 40, the formed space is re-established at the discharge side, so that water is depressurized and a gas is restored and discharged through the outlet 22 out of the third chamber 20. When the six-blade rotors 40 are thus rotated in the opposite directions, the water and the carbon dioxide-containing gas are fed from the inlet 21 side to the outlet 22 side while pressurization and depressurization are repeated alternately.

The rotor shaft 41a is rotatably supported by a bearing unit 42 provided at the outer rear side of the third chamber as illustrated in FIG. 3. The other rotor shaft 41b is rotatably supported by a bearing unit 43 provided at the outer front side of the third chamber 20 as illustrated in FIG. 3. The bearing units 42 and 43 are respectively housed in gear boxes 44 and 45.

Mechanical seals 50 for sealing off the third chamber 20 are respectively provided between shaft seal parts and the bearing units 42 and 43. The rotor shafts 41a and 41b respectively extend through the shaft seal parts. As a result, the third chamber 20 can be sealed off.

The rotor shaft 41b is formed to extend through the third chamber 20. The rotor shaft 41b has two ends one of which is located on the gear box 44 and the other of which protrudes out of the gear box 45. A pulley core 46a is formed at the other end side of the rotor shaft 41b. A pulley 46 is mounted to the pulley core 46a as illustrated in FIG. 1 (the pulley 46 and the transmission belt 13 are eliminated in FIG. 3). The transmission belt 13 is wound on the pulley 46. The transmission belt 13 is caused to extend between a driving roller 12a of the motor 12 and the pulley 46 with a predetermined tension so that a driving force of the motor 12 is transmitted through the pulley 46 to the rotor shaft 41b.

A timing gear 47 is fixed to the one end of the rotor shaft 41b in the gear box 44, A timing gear 48 is in mesh engagement with the timing gear 47 as illustrated in FIG. 3. Since the timing gear 48 is fixed to the rotor shaft 41a, the driving force of the motor 12 can be transmitted through the timing gears 47 and 48 to the rotor shaft 41a.

A timing gear unit comprising the timing gears 47 and 48 is covered by a gear cover 49. Upon operation of the timing gear unit, the rotor shaft 41a is rotated in a normal direction and the rotor shaft 41b is rotated in a reverse direction. More specifically, the rotor shafts 41a and 41b are configured to be rotated in the directions opposed to each other. As a result, the paired six-blade rotors 40 are rotated in the directions opposed to each other in the third chamber 20, so that the liquid in the third chamber 20 is pressure-fed through the inlet 21 toward the outlet 22.

Although the biaxial six-blade pump provided with the six-blade rotors 40 disposed in the biaxial parallel manner is employed in the embodiment, the carbon dioxide-containing gas recovery apparatus 10 should not be limited to the biaxial six-blade pump. More specifically, any mixing machine may be employed which is capable of compressing water and bubbles suctioned from the suction port into the third chamber 20 and mixes carbon dioxide-containing gas and water. For example, any rotary mixer may be employed which is capable of suctioning water and bubbles into the third chamber 20 and compressing the water and the bubbles by rotation of a multi-blade rotor including at least two blades. For example, the rotary mixer may include a two-blade pump provided with a pair of biaxial parallel two-blade rotors having a pair of protrusions oppositely protruding from a shaft or a three-blade pump provided with a pair of biaxial parallel three-blade rotors having three protrusions radially protruding from a shaft.

The reason for employment of the biaxial six-blade pump in the embodiment is that in the case of the six-blade rotors 40, the number of times of pressurization and compression of water and carbon dioxide-containing gas per rotation of the rotors is large and the carbon dioxide-containing gas recovery efficiency can be improved.

The carbon dioxide-containing gas recovery apparatus 10 having the above-described structure will work as follows.

Arrows in FIG. 1 indicate a flow of water supplied into and discharged from the carbon dioxide-containing gas recovery apparatus 10. When water is supplied through the water supply pipe 17 and the water supply opening 15a into the pump housing 11 according to the directions of the arrows and a carbon dioxide-containing gas is blown from the gas inlet 24 into the first chamber 23 filled with the water, the carbon dioxide-containing gas dissolves in the water and the carbon dioxide-containing gas remaining undissolved is existent as a large number of bubbles A in the water, as shown in FIG. 2.

The water containing a large number of bubbles A is suctioned from the inlet 21 into the third chamber 20 by rotation of the six-blade rotors 40, as illustrated in FIG. 2. In this case, the water and the bubbles A are suctioned into the space encompassed by the three sides formed by two adjacent protrusions of one of the six-blade rotors 40 and one of the protrusions of the other six-blade rotor 40. The water and the bubbles A in the space are compressed by the oppositely disposed paired six-blade rotors 40. The bubbles A, when compressed, are refined into bubbles B.

When the bubbles A are refined into the bubbles B, the carbon dioxide-containing gas further dissolved in the water by the compressing action of the six-blade rotors 40.

On the other hand, as illustrated in FIG. 2, the carbon dioxide-containing gas contained in the refined bubbles B has a smaller volume than the carbon dioxide-containing gas contained in the bubbles A regarding the bubbles B remaining undissolved in the second chamber. Accordingly, even when the bubbles B are discharged from the water outlet 15b with the result that the carbon dioxide-containing gas is discharged into the atmosphere, an amount of discharged carbon dioxide-containing gas can be reduced as compared with the case where the bubbles A are discharged from the water outlet 15b.

As illustrated in FIG. 2, water solution of the carbon dioxide-containing gas is discharged through the outlet 22 out of the third chamber 20 to be further discharged through the second chamber 26 and the water outlet 15b into the water discharge pipe 19 as illustrated in FIG. 1.

As a result, the carbon dioxide-containing gas recovery apparatus 10 can reduce environmental load as compared with the conventional manner that consumes a chemical absorption solution or a large amount of electric power.

Verification experiments were conducted for the recovery efficiency of the carbon dioxide-containing gas recovery apparatus 10 of the embodiment. The verification experiments will be explained with reference to the attached drawings.

The verification experiments were carried out under experimental circumstances as illustrated in FIG. 4. A water tank 100 and a flowmeter 101 were connected to the water supply pipe 17 of the carbon dioxide-containing gas recovery apparatus 10. As a result, a flow rate of supplied water could easily be grasped. A carbon dioxide cylinder 102 and an air flow meter 104 were connected to the gas inlet 24, instead of the generation source of the carbon dioxide-containing gas. The carbon dioxide cylinder 102 had a carbon dioxide regulating valve 103, and the air flow meter 104 had an inlet air regulating valve 105. A mixing ratio of air and carbon dioxide was regulated by regulating the carbon dioxide regulating valve 103 and the inlet air regulating valve 105 with the result that a mixed gas with a changed carbon dioxide concentration could be formed. Accordingly, experimental classification could easily be made.

It is now assumed that a carbon dioxide-containing gas emitted from the large-scale generation source such as thermo-electric power plants has a carbon dioxide concentration ranging from 20% to 30%. The experiments were conducted according to the assumption. The other experimental conditions were as follows:

Diameters of the inlet 21 and the outlet 22 of the biaxial six-blade pump: 50 mm
Rotating speeds of the six-blade rotors 40: 1700 rpm
Rated output of the motor 12: 1.5 kW
Temperature of water to be poured: 20° C.
Ambient temperature: 25° C.
Amount of water to be poured and carbon dioxide gas dissolved in raw water stored in the pump housing 11: 18.2 mg/L
Density of carbon dioxide gas: 1.81 g/L (25° C.)
Instrument for measuring dissolved amount of carbon dioxide gas: Model Ti-9004 manufactured by Toko Chemical Laboratories Co., Ltd.

The following three experiments were conducted. FIG. 5 illustrates results of the experiments.
1) Experiment A
Amount of injected carbon dioxide gas: 10 L/min
Amount of injected air: 90 L/min
Amount of injected water: 120 L/min
Concentration of carbon dioxide gas: 10%
Output of motor 12: 1.2 kW
2) Experiment B
Amount of injected carbon dioxide gas: 20 L/min
Amount of injected air: 80 L/min
Amount of injected water: 130 L/min
Concentration of carbon dioxide gas: 20%
Output of motor 12: 1.2 kW
3) Experiment C
Amount of injected carbon dioxide gas: 30 L/min
Amount of injected air: 70 L/min
Amount of injected water: 190 L/min
Concentration of carbon dioxide gas: 30%
Output of motor 12: 1.6 kW As the results of the experiments, in experiment A, a measured value of carbon dioxide in the water is 81.2 mg/L, an amount of carbon dioxide contained in the poured water is 131.0 g/h, an amount of carbon dioxide contained in the injected air is 1086.0 g/h, and a measured value of carbon dioxide dissolved in the water is 584.6 g/h, so that an amount of carbon dioxide recovered by the carbon dioxide-containing gas recovery apparatus 10 of the embodiment is 453.6 g/h. Since an amount of carbon dioxide discharged to the atmosphere without recovery is 763.4 g/h, the carbon dioxide gas recovery efficiency by the carbon dioxide-containing gas recovery apparatus 10 is 37.3%.

In addition, an amount of carbon dioxide emitted for generation of electric power consumed by the motor 12 is regarded as 596.4 g/h, a total amount of carbon dioxide recovered in experiment A is −142.8 g/h.

In experiment B, a measured value of carbon dioxide in the water is 147.2 mg/L, an amount of carbon dioxide contained in the poured water is 142.0 g/h, an amount of carbon dioxide contained in the injected air is 2172.0 g/h, and a measured value of carbon dioxide dissolved in the water is 1148.2 g/h, so that an amount of carbon dioxide recovered by the carbon dioxide-containing gas recovery apparatus 10 of the embodiment is 1006.2 g/h. Since an amount of carbon dioxide discharged to the atmosphere without recovery is 1307.8 g/h, the carbon dioxide gas recovery efficiency by the carbon dioxide-containing gas recovery apparatus 10 is 43.5%.

In addition, an amount of carbon dioxide emitted for generation of electric power consumed by the motor 12 is regarded as 596.4 g/h, a total amount of carbon dioxide recovered in experiment B is 409.8 g/h.

In experiment C, a measured value of carbon dioxide in the water is 149.7 mg/L, an amount of carbon dioxide contained in the poured water is 207.5 g/h, an amount of carbon dioxide contained in the injected air is 3258.0 g/h, and a measured value of carbon dioxide dissolved in the water is 1706.6 g/h, so that an amount of carbon dioxide recovered by the carbon dioxide-containing gas recovery apparatus 10 of the embodiment is 1499.1 g/h. Since an amount of carbon dioxide discharged to the atmosphere without recovery is 1966.4 g/h, the carbon dioxide gas recovery efficiency by the carbon dioxide-containing gas recovery apparatus 10 is 43.3%.

In addition, an amount of carbon dioxide emitted for generation of electric power consumed by the motor 12 is regarded as 795.2 g/h, a total amount of carbon dioxide recovered in experiment A is 703.9 g/h.

Manners of calculating various factors in experiments A to C as depicted in FIG. 5 will be explained using experiment C by way of example.

Raw water contains 18.2 mg/L carbon dioxide and is injected at the rate of 190 L per minute. Accordingly, the measured value of carbon dioxide in the water is obtained as:

$$\text{Measured value of carbon dioxide in water} = 18.2 \text{ [mg/L]} \times 190 \text{ [L/min]} \times 60 \div 1000 = 207.5 \text{ [g/h]}$$

Next, air introduced through the gas inlet 24 into the pump housing 11 is injected at the rate of 30 L per minute and carbon dioxide has a density of 1.81 g/L under the experimental circumstances. Accordingly, an amount of carbon dioxide contained in the injected air is obtained as:

$$\text{Amount of carbon dioxide contained injected air} = 30 \text{ [L/min]} \times 1.81 \text{ [g/L]} \times 60 = 3258 \text{ [g/h]}$$

Accordingly, the total amount of injected carbon dioxide in experiment C is obtained as 3465.5 g/h by adding 207.5 g/h of carbon dioxide contained in the water and 3258 g/h carbon dioxide contained in the injected air.

On the other hand, the measured value of carbon dioxide contained in the water is 149.7 mg/L and the water is injected at the rate of 190 L per minute. Accordingly, a total measured value with the experiment conducted for one hour is obtained as:

$$\text{Measured value of dissolved carbon dioxide} = 149.7 \text{ [mg/L]} \times 190 \text{ [L/min]} \div 1000 \times 60 = 1706.6 \text{ [g/h]}$$

As a result, an amount of carbon dioxide dissolved in the water by the carbon dioxide-containing gas recovery apparatus 10 of the embodiment is obtained by subtracting 207.5 g/h as an amount of carbon dioxide contained in the injected water from the measured value of dissolved carbon dioxide:

$$\text{Amount of dissolved carbon dioxide} = 1706.6 \text{ [g/h]} - 207.5 \text{ [g/h]} = 1499.1 \text{ [g/h]}$$

As understood from the foregoing, an amount of carbon dioxide emitted into the atmosphere without recovery is obtained by subtracting the above-mentioned amount of dissolved carbon dioxide from the total amount of injected carbon dioxide:

Amount of emitted carbon dioxide=3465.5 [g/h]−1499.1 [g/h]=1966.4 [g/h]

Consequently, the carbon dioxide recovery rate of the carbon dioxide-containing gas recovery apparatus 10 of the embodiment is obtained from the amount of dissolved carbon dioxide and the total amount of injected carbon dioxide:

Carbon dioxide recovery rate=1499.1 [g/h]÷3465.5 [g/h]×100=43.3%

Furthermore, the output of the motor 12 is 1.6 kW in experiment C. An actual emission rate of carbon dioxide emitted for generation of electric power consumed by the motor 12 is 497 $gCo_2$/kWh at the time when and in the area where the experiments were conducted by the inventor. Accordingly, an emission amount of carbon dioxide regarded as emitted by the motor 12 is obtained as:

Emission amount of carbon dioxide of the motor 12=1.6 [kW]×497 [$gCO_2$/kWh]=795.2 [g/h]

Since the amount of carbon dioxide recovered by the carbon dioxide-containing gas recovery apparatus 10 of the embodiment is 1499.1 g/h, a total recovered amount of carbon dioxide in experiment C is obtained as:

Total recovered amount of carbon dioxide=1499.1 [g/h]−795.2 [g/h]=703.9 [g/h]

Accordingly, 703.9 [g/h] carbon dioxide in total can be recovered in view of the carbon dioxide emitted for generation of electric power to drive the motor 12 as well as the experimental circumstances as depicted in FIG. 4.

As understood from the foregoing, it can be confirmed that the recovery rate of carbon dioxide gas is about 43% in each of experiment B in which the carbon dioxide gas concentration is 20% and experiment C in which the carbon dioxide concentration is 30%, as illustrated in FIG. 5. This concentration substantially equals the carbon dioxide gas concentration in the carbon dioxide-containing gas emitted from the large-scale generation source such as the thermo-electric power plants, steel plants, or waste incineration plants. Accordingly, it can be inferred that an identical or similar carbon dioxide-containing gas recovery rate can be achieved when the carbon dioxide-containing gas recovery apparatus 10 of the embodiment is applied to the large-scale generation source.

According to the carbon dioxide-containing gas recovery apparatus 10 of the embodiment, the carbon dioxide-containing gas emitted from the large-scale generation source such as the thermo-electric power plants, steel plants, or waste incineration plants is blown against the water to be dissolved in the water through the use of the carbon dioxide gas having the behavior that the carbon dioxide easily dissolves in water, and the remaining bubbles of carbon dioxide-containing gas are compressed by the six-blade rotors 40 thereby to be refined, so that the carbon dioxide-containing gas is dissolved in the water by compression.

Consequently, a larger amount of carbon dioxide-containing gas can be dissolved in water as compared with the case where the carbon dioxide-containing gas is simply agitated to be mixed, with the result that the carbon dioxide-containing gas recovery efficiency can be improved.

EXPLANATION OF REFERENCE SYMBOLS

10 . . . carbon dioxide-containing gas recovery apparatus, 11 . pump housing, 12 . . . electric motor, 12a . . . driving roller, 13 . . . transmission belt, 14 . . . base, 15a . . . water supply opening, 15b . . . water outlet, 16 and 18 . . . flanged fittings, 17 . . . water supply pipe, 19 . . . water discharge pipe, 20 . . . third chamber, 20a . . . partition wall, 21 . . . inlet, 22 . . . outlet, 23 . . . first chamber, 24 . . . gas inlet, 25 and 28 . . . drainage hole, 26 . . . second chamber, 27 . . . priming water supply opening, 30 . . . gas introducing pipe, 31 . . . on-off valve, 32 . . . priming water supply pipe, 33 . . . priming water supply faucet, 40 . . . six-blade rotors, 41a and 41b . . . rotor shafts, 42 . . . rear bearing unit, 43 . . . front bearing unit, 44 . . . rear gear box, 45 . . . front gear box, 46 . . . pulley, 46a . . . pulley core, 47 . . . rotor shaft 41b side timing gear, 48 . . . rotor shaft 41a side timing gear, 49 . . . gear cover, 50 . . . mechanical seals, 100 . . . water tank, 101 . . . flowmeter, 102 . . . carbon dioxide cylinder, 103 . . . carbon dioxide regulating valve, 104 . . . air flow meter, and 105 . . . inlet air regulating valve.

The invention claimed is:

1. A carbon dioxide-containing gas recovery apparatus which dissolves a carbon dioxide-containing gas in water thereby to recover the carbon dioxide-containing gas, the apparatus comprising:
   a pump housing having a first chamber provided with a water supply opening at a side of the first chamber and a carbon dioxide-containing gas inlet, a second chamber provided with a water outlet, and a third chamber communicating between the first and second chambers; and
   a rotary mixing section including a pair of multiblade rotors and an electric motor driving the rotors, the electric motor being installed at an upper side of the pump housing,
   wherein water is supplied through the water supply opening into the first chamber and a carbon dioxide-containing gas is supplied through the inlet into the first chamber to be dissolved in the water; and
   wherein the water in which the carbon dioxide-containing gas is dissolved is pressure-fed from the first chamber to the third chamber by the rotary mixing section to be discharged through the water outlet.

2. The carbon dioxide-containing gas recovery apparatus according to claim 1, wherein the multiblade rotors are six-blade rotors and the rotary mixing section is a biaxial six-blade pump in which the six-blade rotors are disposed in a biaxial parallel manner.

* * * * *